July 23, 1929.  D. C. KLAUSMEYER  1,721,740
SHAFT GUARD
Filed Dec. 1, 1925    2 Sheets-Sheet 1
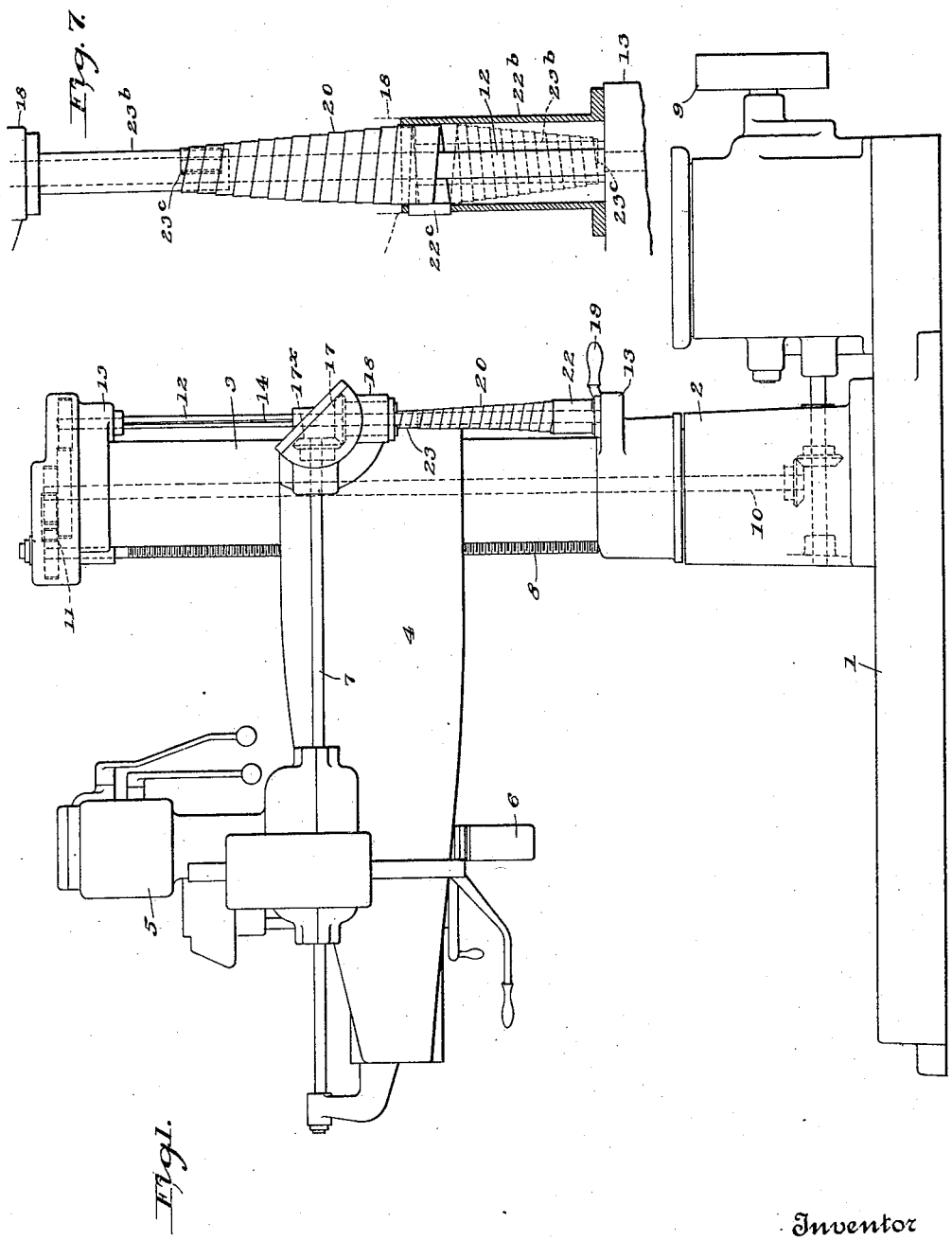
Inventor
David C. Klausmeyer
By  Attorney
Albert F. Nathan

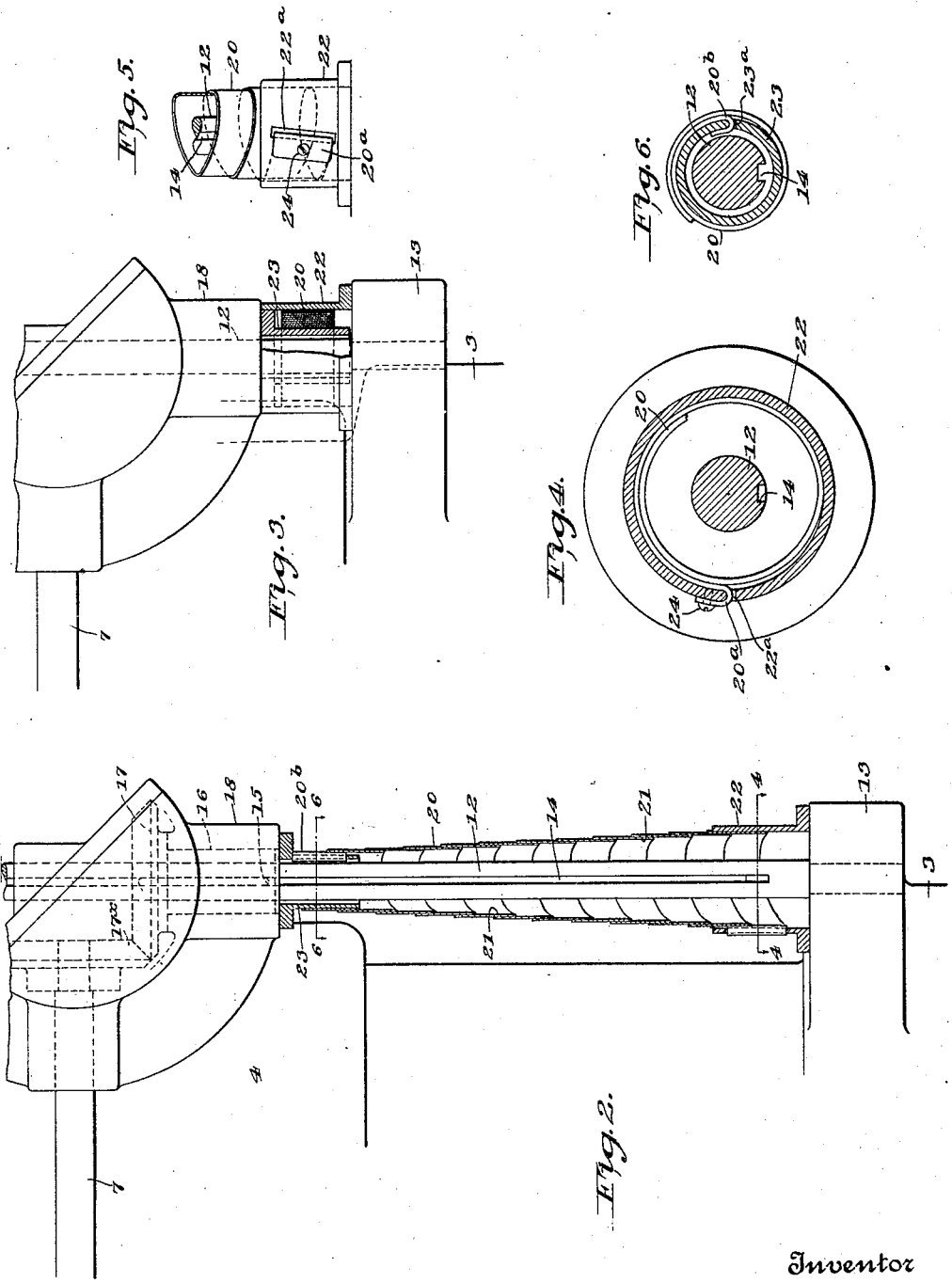

Patented July 23, 1929.

1,721,740

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

SHAFT GUARD.

Application filed December 1, 1925. Serial No. 72,540.

This invention deals with a novel guard structure for encasing moving parts of machinery and it exhibits notable utility as a protector for rotating elements such as shafts and the like; its employment obviating the need of making special housings in certain cases (as where there is no shifting of frame-elements during the usage of machines) and its utility being especially pronounced in those cases where the frame-elements are relatively shiftable during usage by reason of its extremely wide range of extensibility.

Because of the many accidents caused by operators of machinery coming into contact with moving parts thereof, modern machine-design demands that all moving parts (located where they are likely to injure the operator or to engage his clothing) be protectively encased.

In general, as when the moving parts may be interiorly arranged or are of such a nature that, during normal usage, they need not be accessible for adjustment, inspection, removal, etc., the major frame-elements of the machine may be so cast in the form of housings adapted to encase the working parts, thereby securing the desired protection.

In certain instances, (as where the major frame-elements may be assembled in varied relations to produce modified machines) it may be necesasry to employ an assortment of auxiliary or minor casings and, furthermore, there is need for some sort of inexpensive casing construction which may be resorted to wherever it is burdensome to cast or stamp a special auxiliary casing, and where it is desirable to avoid the labor and time required to fit rigid parts accurately together. This need is satisfied by the "universal" arrangement herein proposed for it exhibits a wide range of adjustability which enables it to be applied irrespective of the fixed relationships of the major frame-elements.

Another condition exists which cannot permit the usage of any non-adjustable or rigid type of guard; e. g. where the machinery is so constructed and arranged that a given major frame-element requires, during normal usage, to be shiftable with respect to another major frame-element and where a running shaft, or other moving parts, occupies the open-space or gap between these frame elements.

Now, any guard that during usage must frequently extend and contract must satisfy various incidental needs; to wit, it must (a) be inexpensive, (b) be simple and neat appearing, (c) admit of being easily made and installed, (d) extend and contract uniformly and smoothly, (e) be capable of withstanding accidental blows and more or less rough usage without impairment of its condition or action (f) possess inherent self-lubricating capacities so that all over-riding areas will tend to slide smoothly, (g) capable automatically of providing clearance between any areas tending to bind by friction, and (h) suitable for usage either horizontally or vertically or in any intermediate direction.

These are among the objectives of this invention and it is noteworthy that another aim is to devise a construtcion which will not require careful and accurate machining operations in its manufacture, which may be constructed, without further finishing operations, of material readily available at a reasonable price, and which very easily may be installed in its operative combination with machines undergoing construction, or which may be added to machines completed or in operation.

These objects have been attained by the provision of a shaft guard constructed in the form of a collapsible and extensible spiral helix surrounding the shaft to be guarded and comprising a plurality of overlapping convolutions of resilient thin material such, for example, as sheet steel. The guard is made of a substantially wide thin strip wound into a spiral in the nature of a clock-spring and having its convolutions contiguous and adapted to be extended axially thereby producing a form geometrically known as a spiral helix. At appropriate points, convolutions of the spiral are respectively secured to the major frame-elements of the machine, and these frame-elements may, or may not, be movable relatively to each other and to the rotating shaft to be guarded. The guard is so constructed, with respect to the maximum extension required in any given machine, that even in the extreme separation of the relatively movable frame-elements the convolutions of the helix will still overlap edge-wise, thereby providing a closed guard for the shaft in all of the positions of adjustment of the parts. These over-lapping portions constitute guides for the various convolutions and, therefore, as the guard is extended or collapsed, each convolution will slide (the one within the other) and there will be no tendency of the convolutions to bind or "hang-up" as may the individual sections of telescopic tubular guards.

A material which has been found to be admirable for the construction of the improved guard is spring steel, oil tempered and polished. This material is regularly made very accurate in dimensions at a very low cost by rolling, polishing and tempering operations and affords surfaces which readily slide upon each other and which require very little lubrication. Material of this description may be purchased either in straight flat strips or in spiral form such for example as clock-spring, etc.

A radial drill affords a good example of a machine having normally exposed moving parts constituting a constant source of danger to the operator and this invention will, for convenience, be described in connection with a machine of that type, but it is to be understood that this is merely one embodiment of the invention and that this invention is likewise adaptable to various other uses.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of a radial drill embodying the present invention. Fig. 2 is an enlarged vertical section of the shaft-guard and parts of the radial drill associated therewith. Fig. 3 is a view of the shaft-guard in the collapsed position that it occupies when the relative movable parts at the opposite ends of the guard are brought together. Fig. 4 is a detail section on the line 4—4 of Fig. 2. Fig. 5 is a detail view showing one means for attaching one end of the shaft-guard to one of the relatively movable members of the radial drill. Fig. 6 is a section on the line 6—6 of Fig. 2. Fig. 7 is a detail view, partly in section, showing a modified means for supporting the flexible shaft guard.

Referring more particularly to the drawings, the invention is disclosed as embodied vertically in a radial drill comprising a base 1, a vertical post 2, a sleeve 3 rotatably journaled on the post and a radial arm 4 translatably mounted on the sleeve. The radial arm supports the usual drill-head 5 carrying a tool spindle 6 which is rotated from a shaft 7 journaled lengthwise of the arm. A screw 8, journaled at its opposite ends of the sleeve 3, has a threaded connection with the arm 4 and serves to shift the arm vertically on the sleeve. Power, to rotate the arm shaft 7 and the elevating screw 8, is transmitted from a prime mover 9, up through the post 2 by means of a shaft 10, which is geared to the screw 8 by gears designated generally as 11, and downwardly through a shaft 12 journaled exteriorly of the sleeve 3 in bearings 13. The shaft 12 is provided with a key-way 14 within which slides a key 15 secured in the hub 16 of a bevel-gear 17 journaled in a bearing 18 provided by the arm 4. The gear 17 meshes with a like gear 17$^x$, on the arm-shaft 7 and, through its spline connection with the shaft 12, transmits power to the arm-shaft in all of the vertical positions of the arm. A clamp, of usual construction, is actuated by a hand lever 19 to secure the sleeve in various positions of adjustments on the post.

The foregoing briefly describes one type of machine tool having a normally exposed rotating shaft provided with a key-way which is a constant source of danger to the operator, and therefore one instance in which the improved shaft guard is particularly adaptable.

The improved shaft-guard preferably comprises a single, spirally wound comparatively wide strip 20 of any suitable resilient material, such for example as spring steel, which is capable of being extended into a spiral helix. When the shaft guard is used to guard a shaft extending between relatively shiftable members, as hereinbefore described, one end thereof may be secured, in any suitable manner, to one member and the other end may be secured to the other member, therefore, as the members are separated the spirally wound strip will be extended, as shown in Figs. 1 and 2, and when the parts are moved together the guard will collapse as shown in Fig. 3. In the extended position of the guard the convolutions thereof overlap, as shown at 21, thereby forming a closed guard for the shaft and each convolution serves as a guide for the next as the guard is extended or collapsed. Although it is preferable to have the strip originally wound in a substantially flat spiral and to have its ends secured to the relatively movable members so that when the members are separated the guard will be stretched thereby into a spiral helix, this invention also contemplates originally winding the guard in the form of a spiral helix and having its end contacting with the relatively movable members thereby causing it to collapse into a flat spiral as the members are moved together, and to extend itself as the parts are separated. In this latter form the guard need not be secured to the relatively movable members but merely inserted therebetween about the shaft to be guarded.

One convenient means for securing the opposite ends of the guard to the relatively movable parts consists of a tube 22 secured to the sleeve 3 and adapted to receive within it the outer coil of the guard. The inner, or smaller, coil may surround a smaller tube 23 secured to the arm 4. Any suitable means may be employed for securing the ends of the guard to the tubes 22 and 23. For example, the tubes may be provided with apertures 22$^a$ and 23$^a$ respectively, and the ends 20$^a$ and 20$^b$ of the guard may extend through said apertures and turn back in the nature of hooks. Screws 24 may be passed through apertures in the ends of the guard and threaded into the tubes 22 and 23 to prevent accidental detachment of the guard from the tubes.

It will readily be perceived that this improved guard automatically will adjust itself to various lengths determined by the distance between the members with which it is associated and that, due to its novel construction and arrangement, this adjustment will be effected with extreme smoothness. Considering now that the parts are in the position shown in Fig. 3 and that the arm is subsequently raised, the first upward movement will tend to pull out the smaller of the convolutions. The upward strain on this convolution almost immediately will be transmitted to the next larger convolution and so on, each convolution closely following its predecessor. Likewise, as the guard is collapsed each convolution forms a guide to direct the movement of the next smaller convolution.

Another difficulty, existing in telescopic guards, which the present guard has overcome, is the problem of lubricating the relatively moving surfaces. In telescopic guards, when the guards are used in a vertical position, each of the short sections provides, at its lower end, a horizontal shoulder to which any lubricant, applied to the section, will quickly gravitate. From this shoulder, much of the lubricant may fall through space the full length of the guard without lubricating any of the following sections. Thus, in order properly to lubricate the telescopic guard, each section ought to be lubricated separately which is difficult, if not impossible. While the guard provided by this invention may be used in any position, its exhibits striking advantages when arranged vertically to protect upright shafts. In this position, the convolutions of the extended guard provide, a continuous helical run-way extending the entire length of the guard. The lubricant in a natural way will slowly gravitate and in its course of travel will contact with, and lubricate, the contact areas of each convolution. By this construction the entire guard is adequately lubricated with a very small quantity of lubricant and without the disagreeable dropping of oil as is characteristic of telescopic guards. Each time the guard is contracted, all of its portions will tend to gather the oil for re-distribution when it is extended. Thus, when its is collapsed into the cup 22, as shown in Fig. 3, any oil therein will be picked up by the various convolutions and, as the guard is extended, the oil will be spread upon the inner surface of the convolutions, thereby lubricating them. If desired the cup 22 may be in the nature of a reservoir for oil or it may retain an oil soaked packing with which the convolutions may contact when the guard is collapsed.

Another advantage of a guard of this nature and material is that it is self-aligning, i. e. if by any chance it should receive a blow such as would break, bend or otherwise put an ordinary telescopic guard out of commission, the improved guard would merely yield with the blow and then immediately spring back into its original position, none the worse for the encounter.

When the flexible guard is used between portions which, in their closest relation, are spaced apart a substantial distance the guard may be supported as shown in Fig. 7 which admits of the use of a materially shorter guard than does the construction shown in Figs. 1 to 6 inclusive. In this modified construction the lower tube 22$^b$ and the upper tube 23$^b$, (to which are attached at 22$^c$ and 23$^c$, respectively, the opposite ends of the flexible guard) are materially longer than the tubes 22 and 23, and the flexible guard is secured to the tubes 22$^b$ and 23$^b$ adjacent their upper and lower ends, respectively. Thus, it will be seen that when the relatively movable members are separated their maximum extent the distance between the points of attachment of the guard to the tubes will be materially less than with the construction shown in Figs. 1 to 6 and therefore the flexible guard may be proportionately shorter. When the relatively movable members are brought close together the tube 23$^b$ telescopes into the tube 22$^b$ and the point 23$^c$, at which the guard is secured to the tube 23$^b$, is moved below the point 22$^c$ at which the guard is attached to the tube 22$^b$ thereby passing the smaller convolution bodily through the larger convolution and causing the flexible guard to be extended in the opposite direction as shown in dotted lines in Fig. 7. It is to be understood that the tube or cup 22$^b$ serves the same functions as the tube or cup 22 in the form shown in Figs. 1 to 6, that is it may contain oil or oil soaked packing with which the convolutions may contact.

This invention has been shown and described as an adjustable or extensible shaft guard but it is to be understood that it is not limited to that particular use but may be utilized wherever any part is to be guarded whether or not the part extends between relatively movable members.

Without further analysis, the foregoing will so fully reveal the gist of this invention, that others can, by applying current knowledge, readily adapt it for various utilizations by retaining one or more of the features, that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States,—

1. In combination, a stationary member; a vertically movable member; an upright shaft rotatably mounted in and extending between said members; and a guard for that portion of the shaft intermediate said members and comprising a continuous spirally wound strip of resilient material having its opposite ends attached to said members and extensible into a spiral helix having overlapping convolutions.

2. In combination, a stationary member; a vertically movable member; an upright shaft extending between said members; a self-lubricating adjustable guard for that portion of the shaft intermediate said members, said guard comprising a single continuous strip of resilient material arranged in spiral helical form and comprising a plurality of overlapping convolutions collapsible into a flat spiral; a lubricant container adjacent one end of said guard and arranged to deposit lubricant upon all of the convolutions of said guard when said guard is collapsed; said helical convolutions serving to gradually return the lubricant to its container, said lubricant, in its return, acting to lubricate the contacting surfaces of the convolutions.

3. In combination, relatively movable members; an upright shaft extending between said members; a self-lubricating one-piece collapsible guard surrounding the shaft and connected to said relatively movable members, said guard comprising a strip of resilient material wound spirally into a plurality of convolutions of gradually increasing size and adapted to be extended into a spiral helix as said members are separated, one edge of said guard, in the extended position of said guard, comprising continuous lubricant track which serves to convey lubricant from one end of said guard to the other said lubricant during such conveyance acting to lubricate the inner surfaces of said convolutions.

4. In combination relatively movable members; an upright shaft extending between said members; a self-lubricating guard enclosing said shaft comprising a collapsible spiral elastic spring having an end attached to each of said members; means for lubricating said spring; the inner end of said spring being attached to the upper member whereby in its extended position the spring forms a spiral helix with the smaller convolutions at the upper end.

5. A guard for a rotary shaft said shaft having surfaces thereon capable of grasping loose objects coming in contact therewith comprising a spirally wound member of resilient material; and means to secure the opposite ends of said member to relatively movable parts, said guard being so constructed and arranged as to permit the convolutions of said spirally wound member to be extended laterally into a spiral helix as said relatively movable parts are separated.

6. A guard combining a strip of resilient material wound spirally into a plurality of convolutions of varying size and extended into a spiral helix; a tubular member surrounding the largest of said convolutions and attached thereto; and a second tubular member secured to the smallest of said convolutions; said parts being so constructed and arranged as to permit all of said convolutions and said second tubular member to be entirely inserted within said first named tubular member.

7. A shaft guard combining spaced members; a rotary shaft having portions thereof within said spaced members; a resilient protector, of spiral helical form, surrounding said shaft intermediate said spaced members and cooperating therewith to prevent accidental contact with said shaft.

8. A shaft guard combining spaced, relatively adjustable members; a rotary shaft having portions thereof enclosed within said spaced members and said shaft having surfaces thereon capable of seizing loose objects coming in contact therewith; a protector surrounding said shaft intermediate said spaced members and having its extremities attached thereto, said protector comprising a flat strip of resilient material wound spirally and having its convolutions extended laterally forming a spiral helix, the whole being extensible to various lengths to agree with the variable distance between said relatively movable members.

In witness whereof, I have hereunto subscribed my name.

DAVID C. KLAUSMEYER.